(12) United States Patent
Shindo

(10) Patent No.: US 11,423,268 B2
(45) Date of Patent: Aug. 23, 2022

(54) IMAGE PROCESSING APPARATUS, IMAGE PROCESSING APPARATUS CONTROL METHOD, AND STORAGE MEDIUM

(71) Applicant: CANON KABUSHIKI KAISHA, Tokyo (JP)

(72) Inventor: Yukihiro Shindo, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/348,594

(22) Filed: Jun. 15, 2021

(65) Prior Publication Data

US 2021/0312250 A1 Oct. 7, 2021

Related U.S. Application Data

(63) Continuation of application No. PCT/JP2019/048526, filed on Dec. 11, 2019.

(30) Foreign Application Priority Data

Dec. 20, 2018 (JP) .............................. JP2018-237896

(51) Int. Cl.
G06K 15/02 (2006.01)
(52) U.S. Cl.
CPC ..... G06K 15/1843 (2013.01); G06K 15/1807 (2013.01); G06K 15/1881 (2013.01)
(58) Field of Classification Search
CPC .................................................. G06K 15/1843

USPC ........................................................ 358/2.99
See application file for complete search history.

(56) References Cited

U.S. PATENT DOCUMENTS

2014/0168710 A1    6/2014   Ikari

FOREIGN PATENT DOCUMENTS

| JP | 2006-179998 A | 7/2006 |
| JP | 2006179998 A * | 7/2006 ............. G06T 3/403 |
| JP | 2014-102596 A | 6/2014 |
| JP | 2014-120870 A | 6/2014 |
| JP | 2014-206849 A | 10/2014 |
| JP | 2015-171098 A | 9/2015 |
| JP | 2020-102675 A | 7/2020 |

* cited by examiner

*Primary Examiner* — Jacky X Zheng
(74) *Attorney, Agent, or Firm* — Canon U.S.A., Inc. I.P. Division

(57) ABSTRACT

Provided is an image processing apparatus including an image processing unit that generates a binary image in which the width of a black line has been changed, the binary image constituted by black and white pixels. The image processing apparatus includes a first replacement unit that replaces a white pixel in a first binary image by a black pixel and replaces a black pixel in the first binary image by a white pixel, to generate a second binary image, and a second replacement unit that replaces, in the second binary image in which the width of a black line has been thickened by the image processing unit, a white pixel by a black pixel and replaces a black pixel by a white pixel.

10 Claims, 12 Drawing Sheets

| UI SETTING | | | INTERNAL CONTROL | | |
|---|---|---|---|---|---|
| ADJUSTMENT TARGET | ADJUSTMENT AMOUNT | INPUT INVERSION UNIT | BLACK THICKENING UNIT * THICKENING AMOUNT AND DIRECTION | | OUTPUT INVERSION UNIT |
| BLACK LINES/ BLACK CHARACTERS | NORMAL | ON | BLACK THICKENING 1 (THICKEN BY 1 PIXEL IN LOWER AND RIGHT DIRECTIONS) | | ON |
| | NO ADJUSTMENT | OFF | OFF | | OFF |
| | THINNING | ON | BLACK THICKENING 1 (THICKEN BY 1 PIXEL IN LOWER AND RIGHT DIRECTIONS) | | ON |
| | THICKENING | OFF | BLACK THICKENING 1 (THICKEN BY 1 PIXEL IN LOWER AND RIGHT DIRECTIONS) | | OFF |
| WHITE LINES/ WHITE CHARACTERS | NORMAL | ON | BLACK THICKENING 1 (THICKEN BY 1 PIXEL IN LOWER AND RIGHT DIRECTIONS) | | ON |
| | NO ADJUSTMENT | OFF | OFF | | OFF |
| | THINNING | OFF | BLACK THICKENING 1 (THICKEN BY 1 PIXEL IN LOWER AND RIGHT DIRECTIONS) | | OFF |
| | THICKENING | ON | BLACK THICKENING 2 (THICKEN BY 1 PIXEL IN UPPER, LOWER, LEFT AND RIGHT DIRECTIONS) | | ON |

FIG.5

FUNCTION SETTING SCREEN                                    [?] [X]

ITEM LIST ~502

| SETTING ITEMS | SETTING CONTENTS |
|---|---|
| COLOR NUMBER | FULL COLOR |
| SPECIFIC MODE | HIGH QUALITY |
| RESOLUTION | FINE (600 dpi) |
| MIDDLE TONE | PATTERN 2 |
| TONER SAVING MODE | N/A |
| TONER DENSITY ADJUSTMENT | 0 (NORMAL) |
| COLOR BALANCE ADJUSTMENT | N/A |
| SMOOTHING | 0 (NORMAL) |
| SHARPNESS | 0 (NORMAL) |
| GRAY COMPENSATION | ONLY TEXT |
| IMAGE COMPRESSION | NORMAL |
| TRAPPING | N/A |
| THICKNESS ADJUSTMENT | NORMAL (BLACK LINES/BLACK CHARACTERS) |
| HIGH SATURATION PRINT MODE | N/A |

503

THICKNESS ADJUSTMENT:
ADJUSTMENT TARGET: [BLACK LINES/BLACK CHARACTERS]
                   [WHITE LINES/WHITE CHARACTERS]

ADJUSTMENT AMOUNT: [NORMAL]
                   [NO ADJUSTMENT]
                   [THINNING]
                   [THICKENING]

[BACK TO NORMAL]    [OK]    [CANCEL]    [HELP]

504

501

505

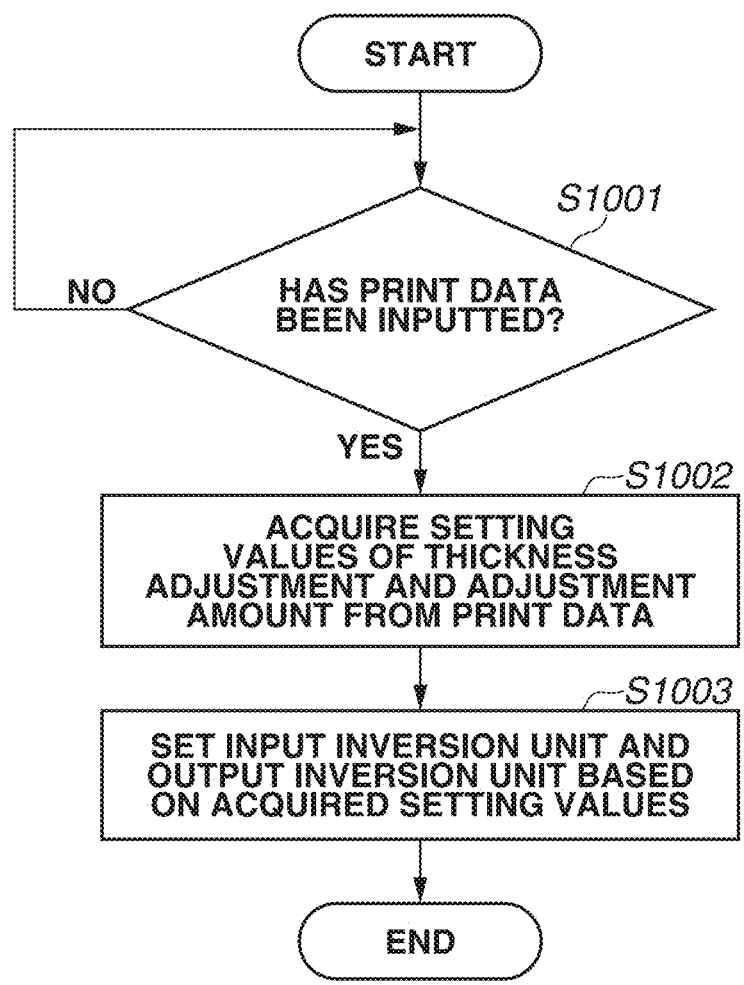

FIG.7

| UI SETTING | | INTERNAL CONTROL | | |
|---|---|---|---|---|
| ADJUSTMENT TARGET | ADJUSTMENT AMOUNT | INPUT INVERSION UNIT | BLACK THICKENING UNIT · THICKENING AMOUNT AND DIRECTION | OUTPUT INVERSION UNIT |
| BLACK LINES/ BLACK CHARACTERS | NORMAL | ON | BLACK THICKENING 1 (THICKEN BY 1 PIXEL IN LOWER AND RIGHT DIRECTIONS) | ON |
| | NO ADJUSTMENT | OFF | OFF | OFF |
| | THINNING | ON | BLACK THICKENING 1 (THICKEN BY 1 PIXEL IN LOWER AND RIGHT DIRECTIONS) | ON |
| | THICKENING | OFF | BLACK THICKENING 1 (THICKEN BY 1 PIXEL IN LOWER AND RIGHT DIRECTIONS) | OFF |
| WHITE LINES/ WHITE CHARACTERS | NORMAL | ON | BLACK THICKENING 1 (THICKEN BY 1 PIXEL IN LOWER AND RIGHT DIRECTIONS) | ON |
| | NO ADJUSTMENT | OFF | OFF | OFF |
| | THINNING | OFF | BLACK THICKENING 1 (THICKEN BY 1 PIXEL IN LOWER AND RIGHT DIRECTIONS) | OFF |
| | THICKENING | ON | BLACK THICKENING 2 (THICKEN BY 1 PIXEL IN UPPER, LOWER, LEFT AND RIGHT DIRECTIONS) | ON |

| 1 | 1 | 1 | 1 | 1 |   | 2 | 2 | 2 | 2 | 2 |
|---|---|---|---|---|---|---|---|---|---|---|
| 1 | 1 | 1 | 1 | 1 |   | 2 | 2 | 2 | 2 | 2 |
| 1 | 1 | 1 | 1 | 1 |   | 2 | 2 | 2 | 2 | 2 |
| 1 | 1 | 1 | 1 | 1 |   | 2 | 2 | 2 | 2 | 2 |
| 1 | 1 | 1 | 1 | 1 |   | 2 | 2 | 2 | 2 | 2 |
|   |   |   |   |   | 0 |   |   |   |   |   |
| 3 | 3 | 3 | 3 | 3 |   | 4 | 4 | 4 | 4 | 4 |
| 3 | 3 | 3 | 3 | 3 |   | 4 | 4 | 4 | 4 | 4 |
| 3 | 3 | 3 | 3 | 3 |   | 4 | 4 | 4 | 4 | 4 |
| 3 | 3 | 3 | 3 | 3 |   | 4 | 4 | 4 | 4 | 4 |
| 3 | 3 | 3 | 3 | 3 |   | 4 | 4 | 4 | 4 | 4 |

601

602
REFERENCE WINDOW
(11 × 11 PIXELS)

HALFTONE PATTERN
(600 dpi/106 LINES)

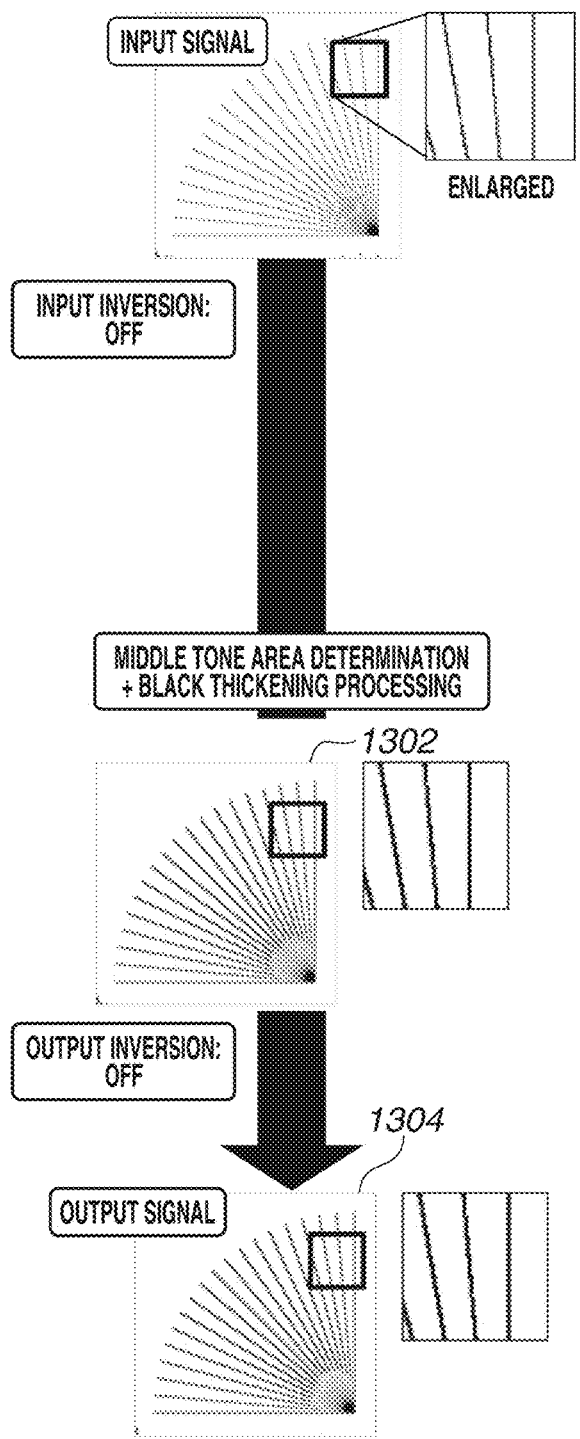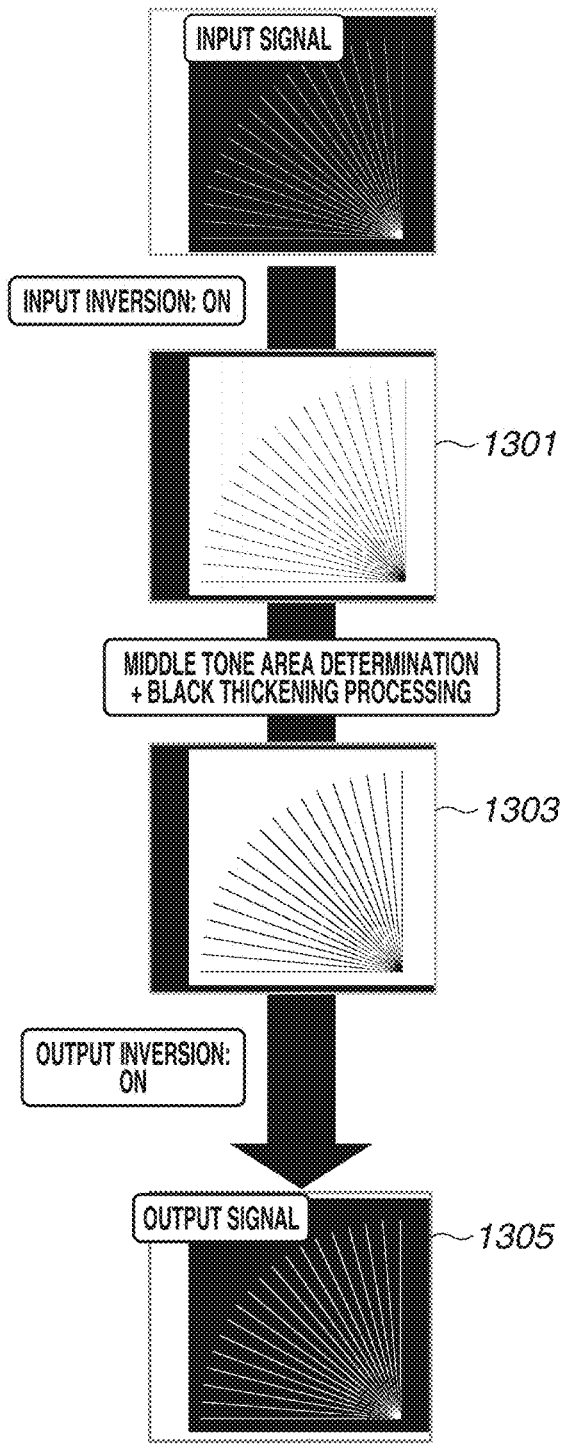

IMAGE PROCESSING APPARATUS, IMAGE PROCESSING APPARATUS CONTROL METHOD, AND STORAGE MEDIUM

CROSS-REFERENCE TO RELATED APPLICATIONS

This application is a Continuation of International Patent Application No. PCT/JP2019/048526, filed Dec. 11, 2019, which claims the benefit of Japanese Patent Application No. 2018-237896, filed Dec. 20, 2018, both of which are hereby incorporated by reference herein in their entireties.

BACKGROUND OF THE INVENTION

Field of the Invention

The present invention relates to an image processing apparatus, and an image processing apparatus control method, and a storage medium.

Background Art

When an image processing apparatus, such as a printer, is used, thin lines in images or characters could be blurred or broken into pieces. Thus, there are cases in which thickening processing of widening the widths of characters and lines in image data is performed before printing so that these lines in the images will not be blurred or broken into pieces after the images are printed on sheets.

Even in a case where white lines or white characters are printed without thickening processing, toner could be applied to white areas. That is, the white areas could be smeared with toner and blurred, and the white lines could appear to be broken into pieces. To prevent this, thickening processing is also performed on the white areas of the white lines and white characters in images so that the white areas will not be smeared with toner. PTL 1 discusses determining whether the signal value of the color of an individual pixel in input image data is less than a predetermined value, and determining the matching pixels to be character or line areas. PTL 1 also discusses performing thickening processing on the determined areas of white characters or lines.

CITATION LIST

Patent Literature

PTL 1: Japanese Patent Application Laid-Open No. 2015-171098

SUMMARY OF THE INVENTION

With the method according to PTL 1, the image processing apparatus needs to add a module for determining white areas and a module for thickening the white lines by adding white pixels to the determined white characters and white lines. The present invention is directed to achieving both a function of thickening black lines/black characters and processing of white lines/white character thickening, with a simple configuration.

An image forming apparatus described in the present invention includes a conversion unit configured to convert a signal value of a white pixel in a first binary image into a signal value of a black pixel and convert a signal value of a black pixel in the first binary image into a signal value of a white pixel, to obtain a second binary image, an adjustment unit configured to thicken a width of a black line detected in the second binary image, and an output unit configured to convert a signal value of a white pixel into a signal value of a black pixel, convert a signal value of a black pixel into a signal value of a white pixel in the binary image in which the width of the black line has been thickened, and output the binary image.

Further features of the present invention will become apparent from the following description of exemplary embodiments with reference to the attached drawings.

BRIEF DESCRIPTION OF THE DRAWINGS

FIG. 5 illustrates an example of a function setting screen displayed on a user interface (UI) unit.

FIG. 6 is a flowchart illustrating processing performed when print data is input according to the present exemplary embodiment.

FIG. 7 is an example of a table including thickness adjustment setting values, ON or OFF of an input inversion unit and an output inversion unit for each of the thickness adjustment setting values, and a thickening direction and a thickening amount a for each of the thickness adjustment setting values, according to the present exemplary embodiment.

FIG. 12A schematically illustrates an example of black line thickening processing and white line thickening processing according to the present exemplary embodiment.

FIG. 12B schematically illustrates an example of black line thickening processing and white line thickening processing according to the present exemplary embodiment.

DESCRIPTION OF THE EMBODIMENTS

First Exemplary Embodiment

Hereinafter, exemplary embodiments of the present invention will be described with reference to drawings.

While the following exemplary embodiments according to the present invention will be described based on a case where an electrophotographic image processing apparatus using toner as recording material is used, the gist of the present invention is not limited to this case. The present invention is also applicable to an inkjet image processing apparatus using ink, without departing from the gist of the present invention. Alternatively, an information processing apparatus, such as a personal computer (PC), may be configured to operate as an image processing apparatus by causing it to perform the following image processing.

Figure 1:
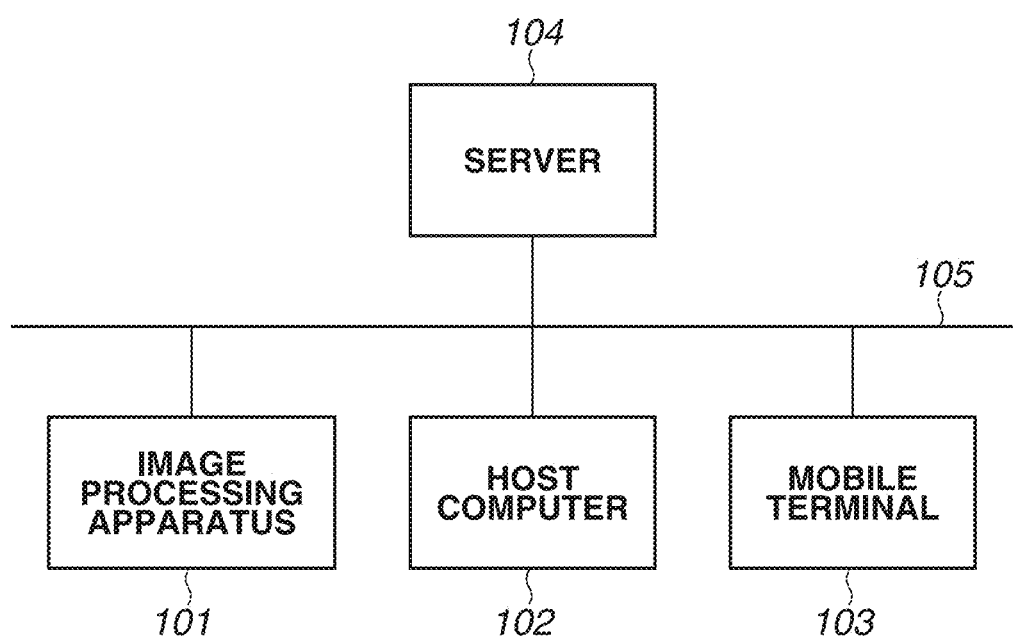
FIG. 1 illustrates a configuration of a system including an image processing apparatus according to an exemplary embodiment.

FIG. 1 illustrates a configuration of a system including an image processing apparatus 101 according to an exemplary embodiment of the present invention. The image processing apparatus 101 receives image data from a host computer 102, a mobile terminal 103, a server 104, or another image processing apparatus (not illustrated) via a network 105 and performs printing (image forming). The image processing apparatus 101 also causes an image reading unit (a scanner) provided therewith to read an original and transmits the read image data to the host computer 102, the mobile terminal 103, or the server 104 via the network 105. The image processing apparatus 101 causes a print unit provided therewith to print the above image data obtained by the image reading unit, and thereby a copy function is realized.

The following description will be made based on a configuration example where the image processing apparatus 101 performs halftone processing on image data. However, the present invention is not limited to this configuration example. Image processing, such as the halftone processing, may be performed by, for example, the host computer 102 serving as an image data transmission source. Alternatively, the image processing apparatus 101 may perform the image processing in coordination with, for example, the host computer 102, the mobile terminal 103, and the server 104 serving as image data transmission sources.

Figure 2:
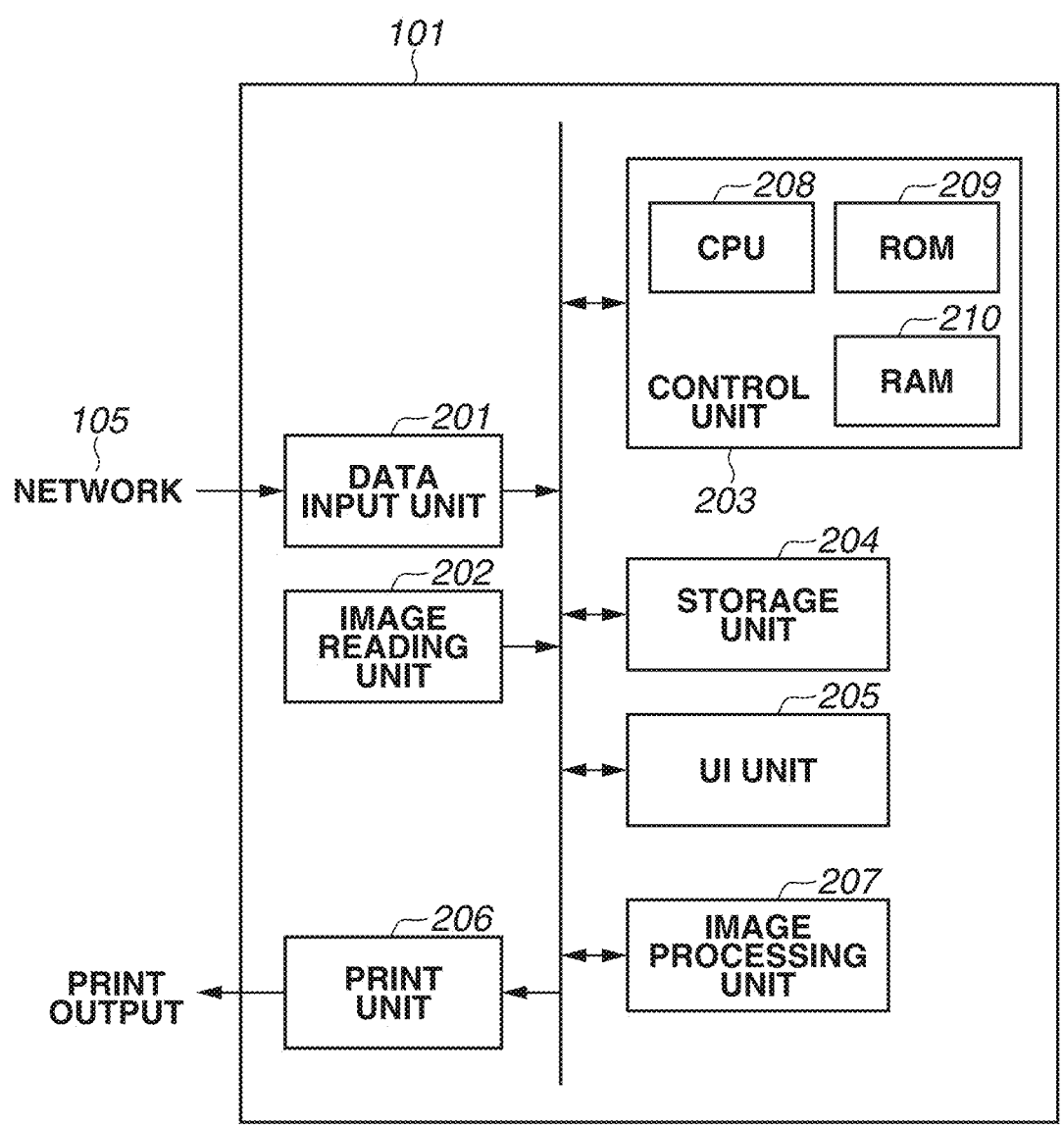
FIG. 2 illustrates a configuration of the image processing apparatus.

A configuration of the image processing apparatus 101 will now be described with reference to FIG. 2. FIG. 2 is a block diagram illustrating an example of a configuration of the image processing apparatus 101 according to the exemplary embodiment.

The image processing apparatus 101 includes a data input unit (a reception unit) 201, an image reading unit 202, a control unit 203, a storage unit 204, a user interface (UI) unit 205, a print unit 206, and an image processing unit 207. The data input unit 201 receives print data transmitted from the server 104 via the network 105. The print data includes settings of the print job and the image data to be rendered. The image reading unit 202 is, for example, a scanner, which reads the image of an original, and outputs the image data of the original. The control unit 203 controls the entire operation of the image processing apparatus 101 and includes a central processing unit (CPU) 208, a read-only memory (ROM) 209, and a random access memory (RAM) 210. The CPU 208 controls the image processing apparatus 101 by executing a program stored in the ROM 209. The storage unit 204 is a storage medium, such as a hard disk drive (HDD), capable of holding a large volume of data. The CPU 208 loads a program stored in the storage unit 204 into the RAM 210 and performs the processing described below. The UI unit 205 includes an operation panel and a display unit, to display messages to the user and receive operation commands from the user. This UI unit 205 includes a touch panel function and receives input from the user through the touch panel.

The print unit 206 is a printer engine. For ease of description, the present exemplary embodiment assumes use of an electrophotographic monochrome printer engine that forms toner images on sheets by using only black toner. However, the present exemplary embodiment is not limited to this example. The print unit 206 may be a color printer engine that forms images by superimposing toner images of a plurality of colors (e.g., cyan, magenta, yellow, and black) on sheets.

The image processing unit 207 performs image processing on image data included in input print data. The image processing unit 207 includes hardware modules dedicated to their respective processing.

A configuration of the image processing unit 207 included in the image processing apparatus 101 according to the present exemplary embodiment will now be described.

Figure 3:
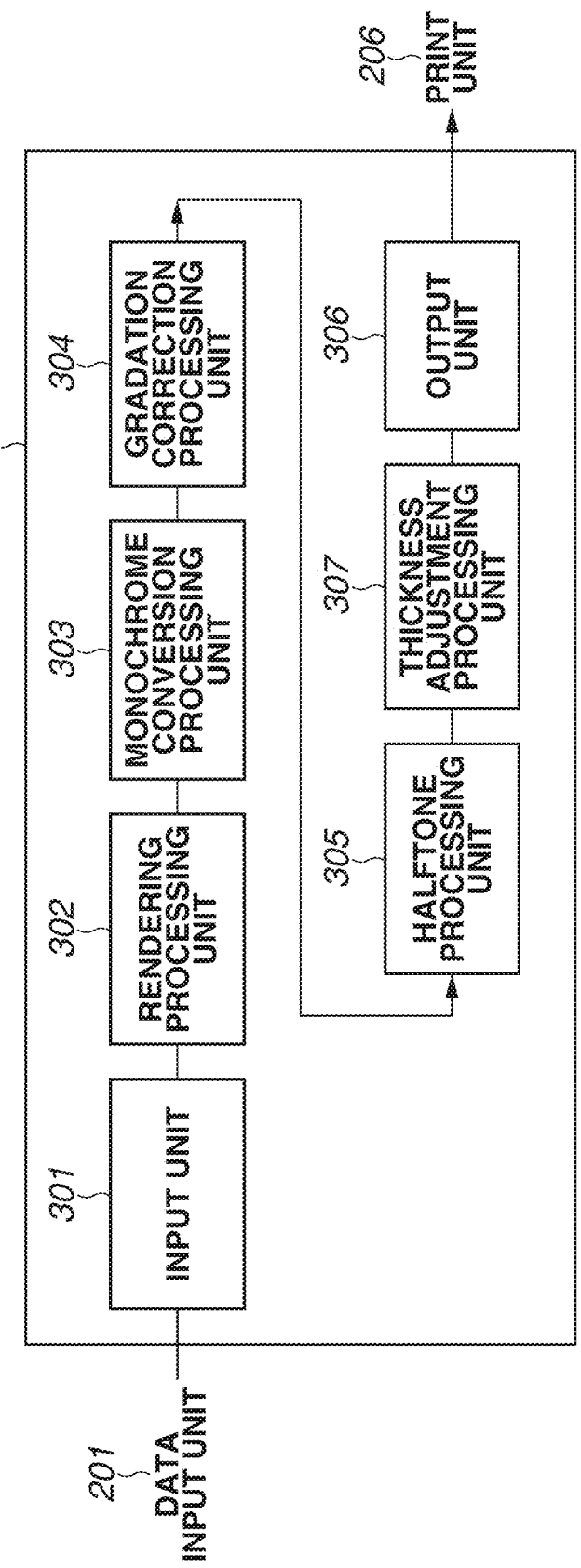
FIG. 3 illustrates a hardware configuration of an image processing unit.

FIG. 3 is a hardware block diagram of the image processing unit 207 included in the image processing apparatus 101 according to the present exemplary embodiment. The image processing unit 207 includes an input unit 301, a rendering processing unit 302, a monochrome conversion processing unit 303, a gradation correction processing unit 304, a halftone processing unit 305, an output unit 306, and a thickness adjustment processing unit 307. While in the present exemplary embodiment the above units 301 to 307 are hardware modules, such as application specific integrated circuits (ASICs), the processing of these units 301 to 307 may be performed by software modules. Alternatively, needless to say, software and hardware modules may be used in coordination with each other for the processing of these units 301 to 307.

For example, the input unit 301 receives the image data written in page description language (PDL) included in the print data received by the data input unit 201 and outputs the image data to the downstream module.

The rendering processing unit 302 generates raster image data by rendering the received PDL data. In this processing, when generating the raster image data, the rendering processing unit 302 refers to the resolution setting included in the print data received by the data input unit 201 and switches the resolution of the image data to be generated.

For example, the monochrome conversion processing unit 303 performs monochrome conversion from a red-green-blue (RGB) image rasterized by using a known method such as a weighted average method of the national television system committee (NTSC) to a gray image. Through this conversion processing performed by the monochrome conversion processing unit 303, the 3-channel RGB image is converted into an image of a 1-channel luminance signal. A lower luminance signal indicates lower (darker) luminance, and a higher luminance signal indicates higher (brighter) luminance.

The gradation correction processing unit 304 corrects a signal value such that an individual portion in the gray scale image output by the monochrome conversion processing unit 303 will have a target output density, based on the density characteristics of the printer. The gradation correction processing unit 304 generates a 1-channel Bk image corresponding to the output of the black toner from the image of the 1-channel luminance signal output by the monochrome conversion processing unit 303. The above-described density characteristics are previously obtained by printing and measuring dot patches obtained by performing halftone processing on multiple-value gradation signal values. In the present exemplary embodiment, when the Bk value of a pixel represents a predetermined signal value, this pixel is considered as a black pixel. Likewise, when the Bk value of a pixel represents another predetermined signal value, this pixel is considered as a while pixel. When the signal value of the individual pixel is represented by 8 bits, a white pixel has a Bk value of 0, and a black pixel has a Bk value of 255. When the monochrome conversion is performed, the signal value of each pixel may be converted into a 1-bit value. In this case, the Bk value of a white pixel is 0, and the Bk value of a black pixel is 1.

The halftone processing unit 305 performs halftone processing on the Bk image data on which the gradation correction has been performed and converts the image data into a binarized dot pattern image (halftone (HT) image) in which the halftone of the image data is represented by area gradation. In the present exemplary embodiment, the halftone processing unit 305 performs black lines/black characters or white lines/white characters thickening processing on the HT image, which is a black and white binary image.

In this case, the halftone processing unit 305 is able to switch the halftone processing method on the image data generated, in accordance with the halftone setting included in the print data received by the data input unit 201. The halftone setting included in the print data may be made on a setting screen including a setting item "halftone" described below with reference to FIG. 5.

The thickness adjustment processing unit 307 detects the black lines/black characters or the white lines/white characters in the HT image and thins or thickens the thickness of the individual line/character. In this processing, the thickness adjustment processing unit 307 switches the thickness adjustment processing on the image data generated, based on the thickness adjustment setting included in the print data received by the data input unit 201. The thickness adjustment setting included in the print data may be made on the setting screen including a setting item "thickness adjustment" described below with reference to FIG. 5. The thickness adjustment processing unit 307, which is a feature according to the present exemplary embodiment of the present invention, will be described in detail below.

The output unit 306 transfers the image data, on which the thickness adjustment has been performed by the thickness adjustment processing unit 307, to the print unit 206.

The thickness adjustment processing unit 307 will now be described in detail with reference to FIG. 4. The thickness adjustment processing unit 307 includes an input inversion unit 401, a halftone area determination unit 402, a black thickening unit 403, and an output inversion unit 404. While the individual modules are hardware modules, such as ASICs, in the present exemplary embodiment, the processing may be performed by software modules or in coordination with hardware modules and software modules.

The input inversion unit 401 is a module that replaces the signal values of the white pixels in the image, on which the halftone processing has been performed, by the signal values of the black pixels. The input inversion unit 401 also replaces the signal values of the black pixels by the signal values of the white pixels. The input inversion unit 401 is used when thinning the black lines/black characters is set or thickening the white lines/white characters is set.

The halftone area determination unit 402 is a module that determines whether each pixel included in the input image, on which the halftone processing has been performed, or the image whose white pixels and black pixels have been inverted by the input inversion unit 401, is a pixel in a halftone area. The halftone area determination unit 402 sets the determination result of an individual pixel as a flag in the corresponding pixel. The processing of the present module will be described below.

The black thickening unit 403 is a processing unit that acquires information indicating whether an individual pixel around a target pixel determined to be a non-halftone by the halftone area determination unit 402 is a white pixel or a black pixel and determines whether the target pixel needs to be changed to a white pixel or a black pixel.

As is the case with the input inversion unit 401, the output inversion unit 404 is a processing unit that replaces the white pixels by black pixels and replaces the black pixels by white pixels after the black thickening unit 403 completes the black line and black character thickening processing. The image output by the output inversion unit 404 is input to the output unit 306 illustrated in FIG. 3. In the present exemplary embodiment, the input inversion unit 401 and the output inversion unit 404 are illustrated as different hardware modules. The input inversion unit 401 and the output inversion unit 404 are each a module that replaces the white pixels by black pixels and replaces the black pixels by white pixels. However, these units 401 and 404 may be configured as a single module. If the input inversion unit 401 and the output inversion unit 404 are configured as a single module, the image output by the black thickening unit 403 is input to the input inversion unit 401 again and is output to the output unit 306 via the input inversion unit 401.

Among the hardware modules included in the thickness adjustment processing unit 307, each of the input inversion unit 401 and the output inversion unit 404 includes a register for switching execution and non-execution of its image processing on the image that this hardware module has received. Based on the thickness setting made on the function setting screen described below, the CPU 208 sets the registers of the input inversion unit 401 and the output inversion unit 404. The settings of the registers will be described below in detail.

Figure 4:
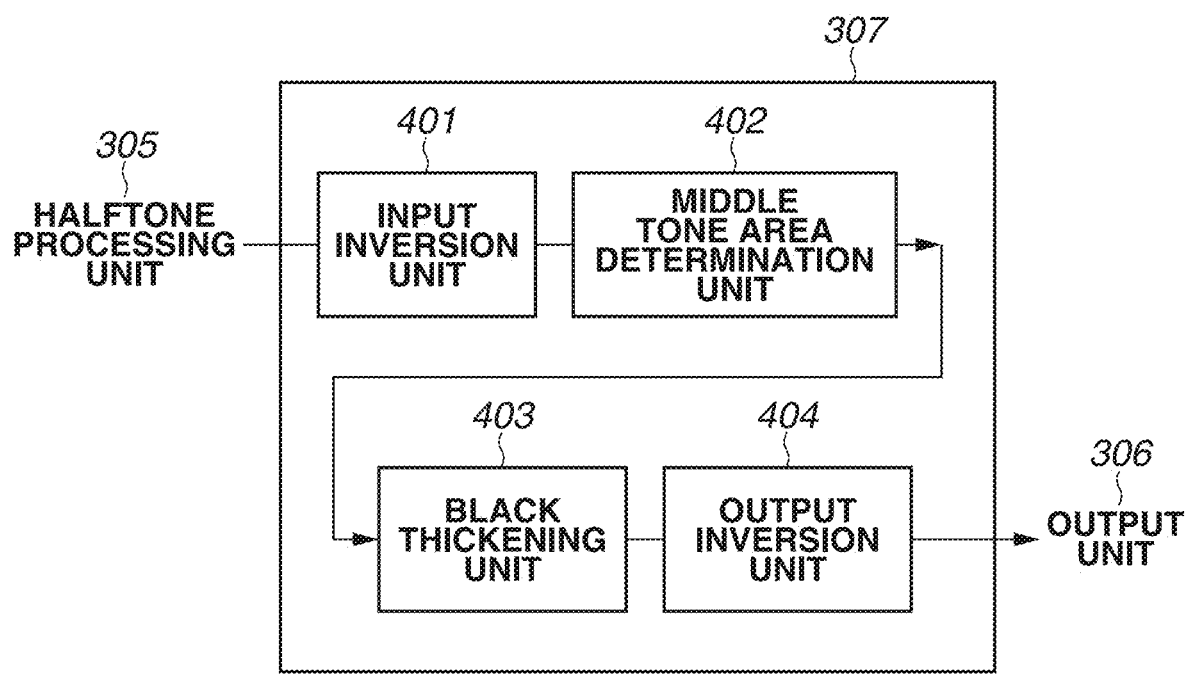
FIG. 4 illustrates a hardware configuration of a thickness adjustment processing unit.

In the present exemplary embodiment, by operating the modules illustrated in FIGS. 3 and 4, the image processing apparatus 101 performs the adjustment processing on the thickness of the black lines/black characters or the white lines/white characters of the image input to the image processing apparatus 101.

Next, how the user configures the print settings according to the present exemplary embodiment will be described with reference to FIG. 5. In the present exemplary embodiment, the user sets the adjustment processing on the width of the black lines/black characters or the white lines/white characters when the user configures the print settings.

FIG. 5 illustrates an example of a function setting screen 501 displayed on a UI unit (not illustrated) by, for example, a printer driver, or an application installed on the host computer 102, the mobile terminal 103, or the server 104. This function setting screen 501 may be displayed on the UI unit 205 included in the image processing apparatus 101.

An "item list" 502 is an area where function setting items specified as options and a list of current setting contents are displayed. The item selected by the user in the "item list" 502 is displayed in a "selected item" 503, and the user can change the details of this setting content. In FIG. 5, the user has selected "thickness adjustment" and can adjust the thickness of characters and lines. In the present exemplary embodiment, the user selects either "black lines/black characters" or "white lines/white characters" as the adjustment target. In addition, the user sets how much the width of the adjustment target is to be changed by selecting one of "normal", "no adjustment", "thinning", and "thickening". When the user selects "normal", the thickness adjustment amount is adjusted by a value previously determined based on characteristics of the printer that performs the printing, the characteristics indicating whether the black lines printed by the printer are easily blurred or the white lines are easily smeared by toner. The processing performed when the thickness adjustment amount "normal" is selected is not limited to thickening the lines/characters of the selected color. Based on the characteristics of the printer, the lines/characters of the selected color is thinned. On the function setting screen 501, the hatched item is the item that has been selected by the user. When the user selects another setting item, the selected setting item is hatched and displayed as the setting content in the area of the "selected item" 503. As illustrated in FIG. 5, the black lines/black characters thickening processing and the white lines/white characters thickening processing are exclusive in the present exemplary embodiment. If one of the processing is enabled, the other processing is disabled.

The user can change the resolution used to render the PDL data and generate image data with a setting item "resolution" illustrated in FIG. 5. The user can select either fine (600 dots per inch (dpi)) or superfine (1200 dpi). In the present exemplary embodiment, an operation performed when the resolution is fine (600 dpi) is basically set will be described. However, the present exemplary embodiment is not limited to this operation.

The pattern of the halftone processing method may be changed based on the attribute signals (e.g., text, graphics, and image (not illustrated)) of an object generated from the information described in PDL with a setting item "halftone" illustrated in FIG. 5. The default setting is "pattern 2" as illustrated in FIG. 5. In this "pattern 2", a large number of lines (e.g., 212 lines) is allocated to the text attribute where reproduction of details is important, and a small number of lines (e.g., 106 lines) is allocated to the graphics/image attribute where stable reproduction of dots is important. By changing the setting of this pattern to another pattern, the user changes a combination of line numbers allocated to the individual attributes and allocation of the error diffusion processing. In the present exemplary embodiment, an individual halftone area is an area where a dot pattern is superimposed on a raster image on which the monochrome conversion has been performed. In contrast, an individual non-halftone area is an area where a dot pattern is not superimposed on a raster image on which the monochrome conversion has been performed.

After the settings on the function setting screen 501, the user selects an "OK" 504 to confirm the displayed settings. After setting the job, the user gives a command to start the printing via a screen (not illustrated). The host computer 102 generates print data on which the setting values set on the function setting screen 501 have been reflected and transmits the print data to the image processing apparatus 101.

Processing of the CPU 208 performed when an image is printed will now be described with reference to FIG. 6. The processing for executing the flowchart illustrated in FIG. 6 is stored in the storage unit 204, and the CPU 208 realizes the processing by loading a program stored in the storage unit 204 into the RAM 210 and executing the program.

In step S1001, the CPU 208 determines whether the data input unit 201 has received data. If the data input unit 201 receives print data via the network 105 (YES in step S1001), the data input unit 201 outputs an interrupt signal to the CPU 208. Upon receiving this interrupt signal, the CPU 208 determines that the data input unit 201 has received print data. Until the data input unit 201 receives print data, the processing performed in step S1001 is continued.

In S1002, the CPU 208 acquires the setting value of the thickness adjustment from the print data. The CPU 208 acquires information indicating whether "black lines/black characters" or "white lines/white characters" is set as the adjustment target of the thickness adjustment from the print data. The CPU 208 also acquires information indicating whether any one of "normal", "no adjustment", "thinning", and "thickening" is set as the adjustment amount. The CPU 208 stores the acquired settings in the RAM 210.

In step S1003, the CPU 208 sets the registers of the input inversion unit 401, the black thickening unit 403, and the output inversion unit 404, based on the settings acquired in step S1002. The CPU 208 refers to the settings acquired in step S1002 and a table stored in the ROM 209 and illustrated in FIG. 7 and sets the input inversion unit 401 and the output inversion unit 404 to ON or OFF. The CPU 208 sets a value indicating whether the adjustment amount indicates "no adjustment" in a register of the input inversion unit 401, the register being different from the above register. The CPU 208 also sets the information about the adjustment amount acquired in step S1002 in the register of the black thickening unit 403. A value indicating how much thickening is needed in which direction may be set in the register of the black thickening unit 403. Alternatively, a value indicating that the thickening is performed in which one of the predetermined patterns may be set in the register of the black thickening unit 403. The table in FIG. 7 includes various thickening patterns. "Black thickening 1" indicates a pattern of thickening by 1 pixel in lower and right pixel directions with a black line/black character, and "black thickening 2" indicates a pattern of thickening by 1 pixel in the upper, lower, left, and right directions with a black line/black character.

FIG. 7 is a table indicating the thickness adjustment settings settable on the function setting screen 501 and ON and OFF of the input inversion unit 401 and the output inversion unit 404 in the individual settings. When the input inversion unit 401 is ON, the input inversion unit 401 replaces a white pixel in the input image by a black pixel and replaces a black pixel in the input image by a white pixel. When the input inversion unit 401 is OFF, the input inversion unit 401 does not replace a white pixel in the input image by a black pixel and replace a black pixel in the input image by a white pixel. The same applies to ON and OFF of the output inversion unit 404.

This table also indicates which pixels around the target pixel are to be changed to black pixels in the individual setting. For example, when "black lines/black characters" are set as the adjustment target and "thickening" is set as the adjustment amount on the function setting screen 501, the CPU 208 sets the register in the input inversion unit 401 to OFF, that is, sets a value that does not cause the input inversion unit 401 to invert the input image. The CPU 208 further sets the register in the output inversion unit 404 to OFF, that is, sets a value that causes the output inversion unit 404 to output the input image without inverting the input image.

Upon completion of step S1003, the CPU 208 ends the processing illustrated in FIG. 6. Upon completion of the processing illustrated in FIG. 6, the image data input to the data input unit 201 via the network 105 is input to the image processing unit 207, and generation of the image to be printed is started.

The image data input to the image processing unit 207 is input to the modules 301 to 305 in the image processing unit 207 in order, and a halftone image is generated. The thickness adjustment processing performed on the generated halftone image will be described with reference to FIG. 8.

Figure 8:
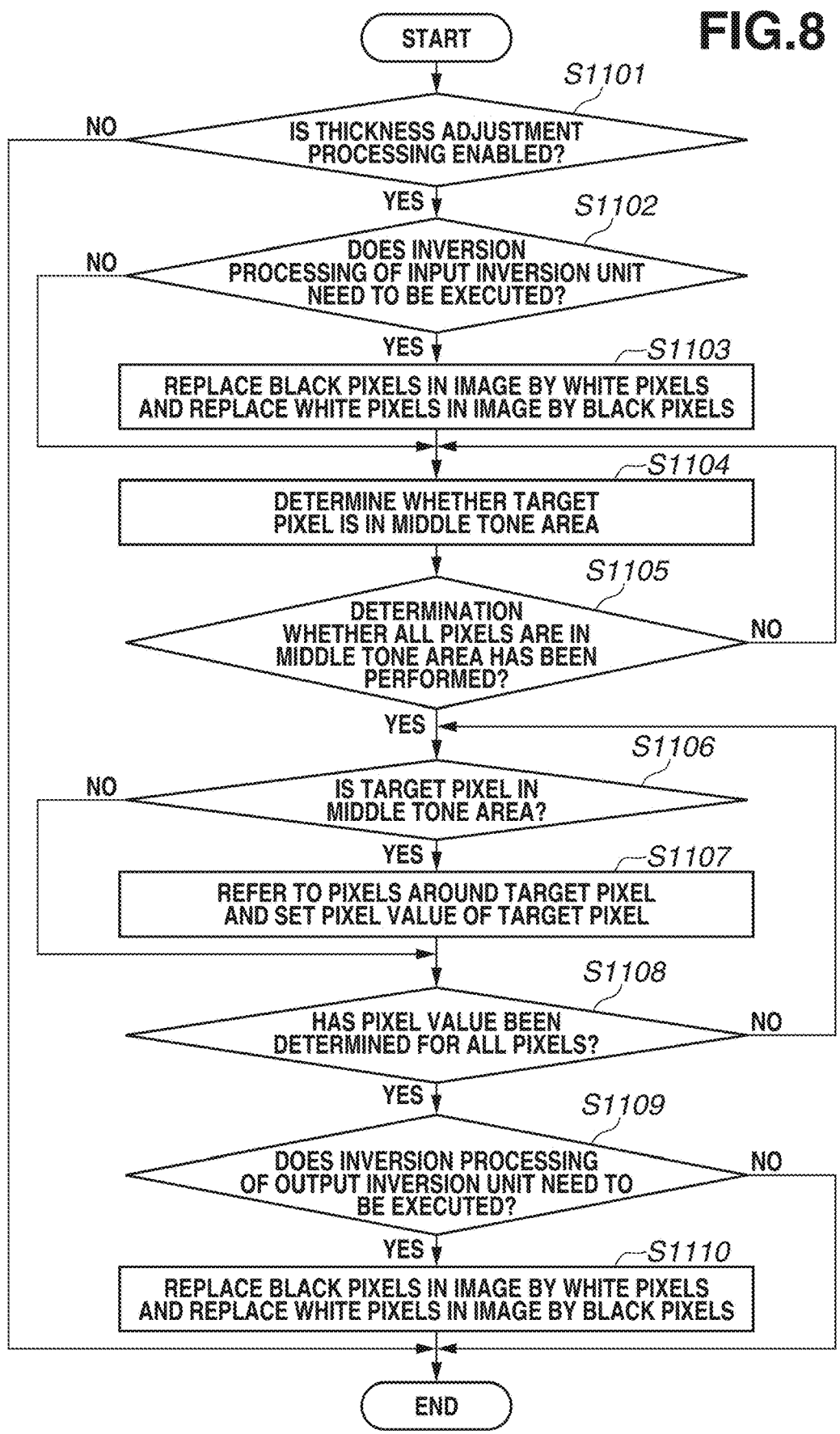
FIG. 8 is a flowchart illustrating processing performed by the thickness adjustment processing unit according to the present exemplary embodiment.

FIG. 8 is a flowchart illustrating the processing performed on the image data input to the thickness adjustment processing unit 307. The processing illustrated in this flowchart is executed by the hardware modules 401 to 404 included in the thickness adjustment processing unit 307.

In step S1101, the input inversion unit 401 refers to the adjustment amount set in the register of the input inversion unit 401 and determines whether the thickness adjustment processing is enabled. The adjustment amount to be referred is the value set by the CPU 208 in step S1003. If the adjustment amount indicates "no adjustment", the input inversion unit 401 determines that the thickness adjustment processing is disabled. If the adjustment amount indicates a value other than "no adjustment", the input inversion unit 401 determines that the thickness adjustment processing is enabled. In step S1101, if the thickness adjustment processing is disabled (NO in step S1101), the input inversion unit 401 outputs the input image to the output unit 306 without inverting the input image and ends the processing illustrated in the flowchart.

If the thickness adjustment processing is enabled (YES in step S1101), the processing proceeds to step S1102. In step S1102, the input inversion unit 401 refers to the register controlling ON/OFF of the inversion operation and determines whether to perform the inversion processing. If OFF is set in the register (NO in step S1102), the input inversion unit 401 outputs the image to the halftone area determination unit 402 without inverting the image, and the processing proceeds to step S1104. In contrast, if the register indicates ON (YES in step S1102), the processing proceeds to step S1103. In step S1103, the input inversion unit 401 replaces the black pixels in the input image by white pixels and replaces the white pixels in the input image by black pixels. The input inversion unit 401 outputs the inverted image whose pixels have been replaced to the halftone area determination unit 402, and the processing proceeds to step S1104. FIGS. 12A and 12B each schematically illustrate an input image and the thickness adjustment processing performed on the input image according to the present exemplary embodiment. FIG. 12A schematically illustrates a case where "black lines/black characters" is set as the adjustment target of the thickness adjustment and "thickening" is set as the adjustment amount. FIG. 12B schematically illustrates a case where "white lines/white characters" is set as the adjustment target of the thickness adjustment and "thickening" is set as the adjustment amount. Since the input inversion unit 401 does not perform the inversion in FIG. 12A, the input image is input to the halftone area determination unit 402 without change. In contrast, since the input inversion unit 401 performs the inversion in FIG. 12B, an image 1301 in which the white pixels and the black pixels have been inverted is input to the halftone area determination unit 402.

Figures 9A, 9B:
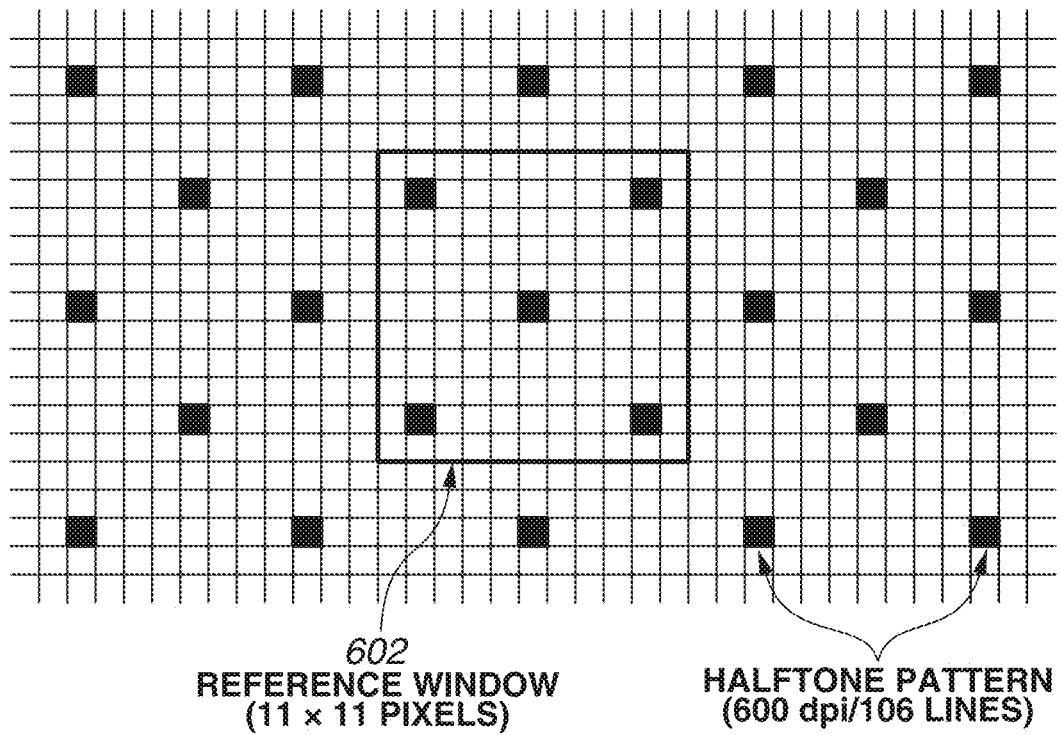
FIG. 9A schematically illustrates pattern matching used by a halftone area determination unit according to the present exemplary embodiment.
FIG. 9B schematically illustrates pattern matching used by a halftone area determination unit according to the present exemplary embodiment.

In step S1104, the halftone area determination unit 402 determines whether a target pixel is located in a halftone area. The halftone area determination unit 402 performs this determination through pattern matching using a certain halftone pattern. The halftone area determination unit 402 sets a flag indicating that the target pixel is located in a halftone area. FIG. 9A is an example of a reference window 601 used by the halftone area determination unit 402. The reference window 601 used in the present exemplary embodiment is formed by 11×11 pixels. The halftone area determination unit 402 refers to the setting of the "halftone" 505 on the function setting screen 501 and determines the window size based on a pattern with the lowest number of lines among the patterns used in the patterns set in the corresponding setting item. A lower number of lines used to represent a halftone results in a larger window size used for the halftone area determination.

FIG. 9B illustrates a halftone pattern used when 106 dither lines are applied with a print resolution of 600 dpi. A reference window 602 is a reference window used in the pattern matching in the present exemplary embodiment. As seen from FIG. 9B, if the window size is 11×11 pixels, even a highlight portion where there is a small number of dots can be determined to be located in a halftone area. As described above, the halftone area determination unit 402 determines a non-halftone area by using a pattern of a window size larger than a dot pattern used to represent a halftone of the binary image.

For the above determination, it is necessary to change the window size to be referred to, depending on the print resolution and the applied number of dither lines. In a case where the printing is performed with a high print resolution or in a case where a halftone area to which a low number of dither lines has been applied is determined, a reference window of a large window size is needed.

The halftone area determination unit 402 performs the halftone area determination as follows. In FIG. 9A, if pixel "0" is the target pixel and all the pixels in areas "1" are white pixels, the halftone area determination unit 402 determines that the target pixel is in a non-halftone area. Likewise, if all the pixels in areas "2" are white pixels, if all the pixels in areas "3" are white pixels, and if all the pixels in areas "4" are white pixels, the halftone area determination unit 402 determines that the target pixel is in a non-halftone area. If there is a black pixel in each of the areas "1", "2", "3", and "4", the halftone area determination unit 402 determines that the target pixel is a pixel in a halftone area.

Figure 10A:
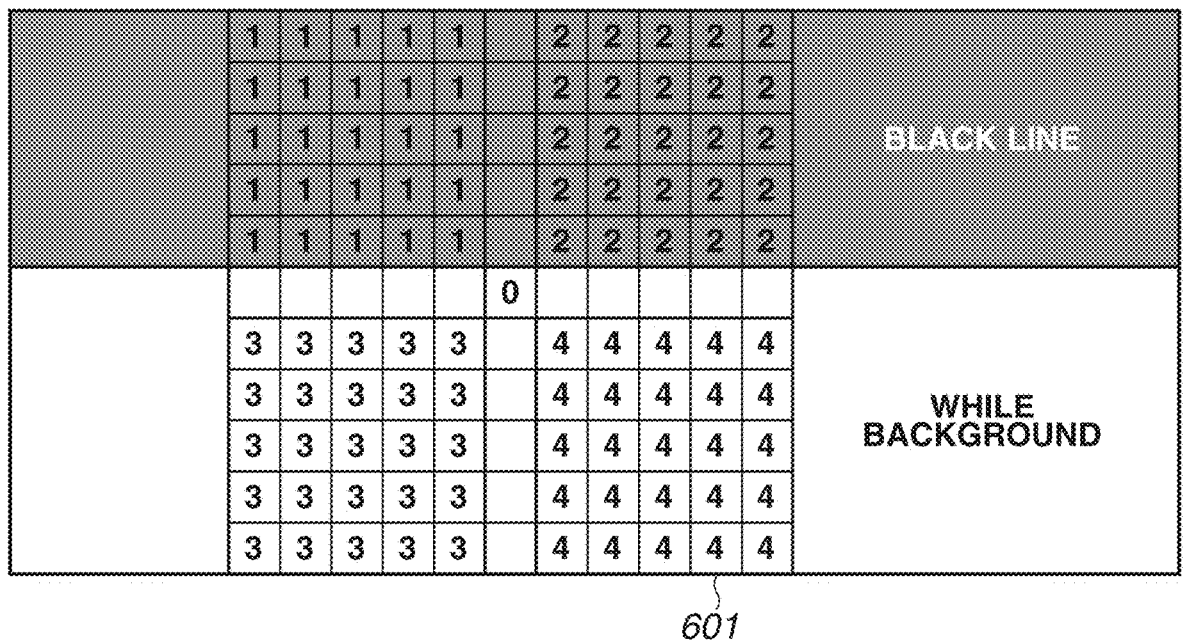
FIG. 10A illustrate an example of a halftone area and a non-halftone area according to the present exemplary embodiment.

Through the halftone area determination in the present exemplary embodiment, as illustrated in FIG. 10A, a target pixel that is located in a white background and that neighbors a black line is determined to be in a non-halftone area. In contrast, as illustrated in FIG. 10B, a target pixel constituting a white thin line and neighboring a black line is determined to be located in a halftone area.

Figure 10B:
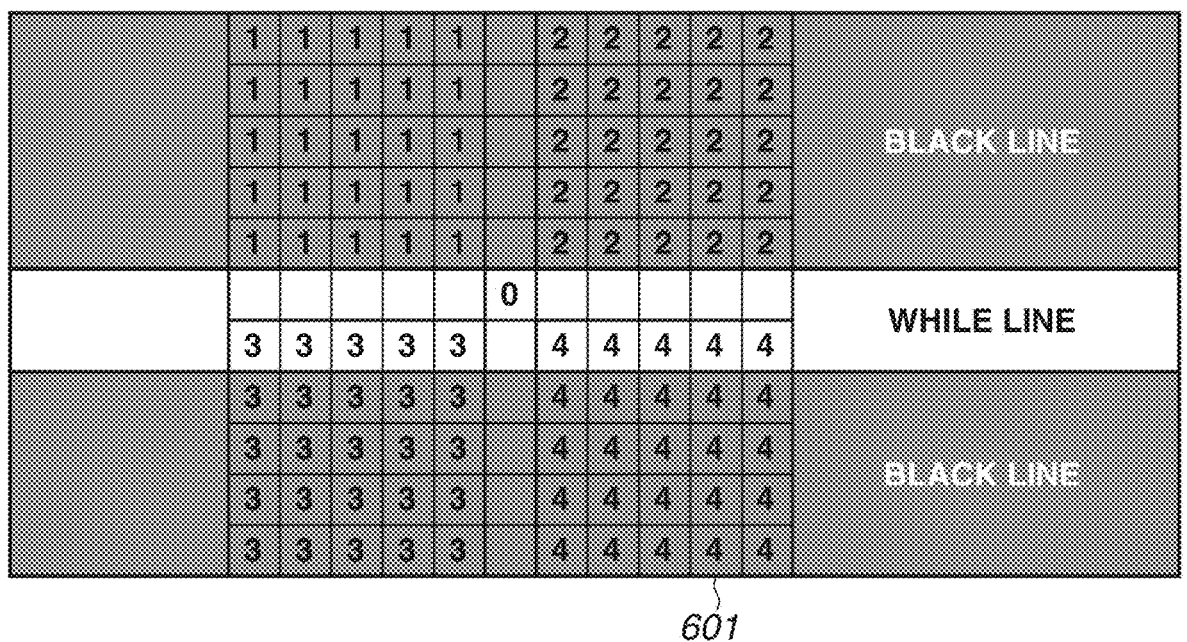
FIG. 10B illustrate an example of a halftone area and a non-halftone area according to the present exemplary embodiment.

In the black thickening processing described below, since the black lines in the halftone areas are not thickened, the black line portions constituting white thin lines as those illustrated in FIG. 10B are not thickened. In this way, the white areas are not smeared with toner even when the black thickening processing is performed.

In step S1105, the halftone area determination unit 402 determines whether the determination whether all pixels within a page are in a halftone area has been performed. If there is a pixel on which this determination has not been performed yet (NO in step S1105), the processing returns to step S1104, and the halftone area determination unit 402 performs steps S1104 and S1105 using this pixel as the target pixel.

If the determination has been performed on all pixels (YES in step S1105), the processing proceeds to step S1106. In step S1106, the black thickening unit 403 determines whether a target pixel is in a non-halftone area. The black thickening unit 403 refers to the flag added to the target pixel in step S1104 and determines whether the target pixel is in a non-halftone area. If the target pixel is not in a halftone area (NO in step S1106), the black thickening unit 403 does not perform the thickening processing, and the processing proceeds to step S1108. In contrast, if the target pixel is in a halftone area (YES in step S1106), the black thickening unit 403 refers to the value of the register indicating the adjustment amount and the pixel values of the pixels around the target pixel and sets the pixel value of the target pixel.

In step S1107, the black thickening unit 403 performs the pattern matching on the image output by the input inversion unit 401 and sets the pixel value of the target pixel.

Figure 11:
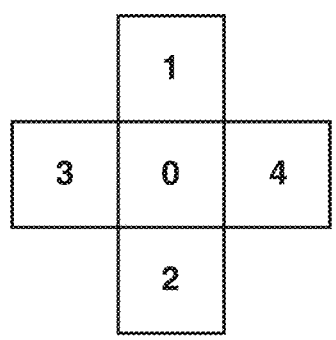
FIG. 11 illustrates an example of a reference window used in black thickening processing performed by a black thickening unit according to the present exemplary embodiment.

FIG. 11 illustrates a reference window used in the thickening processing performed by the black thickening unit 403.

The black thickening unit 403 performs the black thickening processing as follows. Assuming that the target pixel is pixel 0, the black thickening unit 403 determines whether pixels 1 to 4 are each a white pixel or a black pixel and based on the result, determines whether the target pixel (pixel 0) needs to be changed to a white pixel or a black pixel. When thickening by 1 pixel in the upper direction is set, the thickening unit 403 sets the target pixel to a black pixel if both pixels 0 and 1 are white pixels and pixel 2 is a black pixel. When thickening by 1 pixel in the lower direction is set, the thickening unit 403 sets the target pixel to a black pixel if pixels 0 and 2 are white pixels and pixel 1 is a black pixel. When thickening by 1 pixel in the left direction is set, the thickening unit 403 sets the target pixel to a black pixel if pixels 0 and 3 are white pixels and pixel 4 is a black pixel. When thickening by 1 pixel in the right direction is set, the thickening unit 403 sets the target pixel to a black pixel if pixels 0 and 4 are white pixels and pixel 3 is a black pixel. When, as illustrated in FIG. 7, the adjustment target indicates "black lines/black characters", the adjustment amount indicates "thickening", and "black thickening 1 (thickening by 1 pixel in lower and right directions)" are set, the black thickening unit 403 operates as follows. If the target pixel and the pixels therearound satisfy the condition of thickening by 1 pixel in the lower direction or the condition of thickening by 1 pixel in the right direction, the black thickening unit 403 sets the target pixel to a black pixel. That is, the black thickening unit 403 sets the target pixel to a black pixel, if either the condition that "pixels 0 and 1 are white pixels and pixel 2 is a black pixel" or the condition that "pixels 0 and 4 are white pixels and pixel 3 is a black pixel" is satisfied. As described above, the black thickening unit 403 performs its black line/black character thickening processing by replacing a white pixel neighboring a black pixel by a black pixel.

Alternatively, the size of the reference window illustrated in FIG. 11 may be changed based on the number of pixels set as the thickening width.

In step S1108, the black thickening unit 403 determines whether the black thickening unit 403 has performed steps S1106 and S1107 on each pixel as the target pixel. If not (NO in step S1108), the processing returns to step S1106. If the black thickening unit 403 has performed steps S1106 and S1107 on each pixel as the target pixel (YES in step S1108), the black thickening unit 403 inputs the image on which the black thickening has been performed to the output inversion unit 404.

After the black thickening unit 403 completes the black thickening, the black lines in the image are thickened as illustrated by an image 1302 in FIG. 12A or an image 1303 in FIG. 12B, and thereby the black lines are viewed more clearly.

In step S1109, the output inversion unit 404 refers to the value of the register set in step S1003 and determines whether the inversion processing needs to be performed on the image output by the black thickening unit 403. If the output inversion unit 404 determines not to invert the output image (NO in step S1109), the output inversion unit 404 outputs the image received from the black thickening unit 403 to the output unit 306 without change and ends the processing in the flowchart. In FIG. 12A, the output inversion unit 404 is set to OFF, and thus an image 1304 is output to the output unit 306.

If the output inversion unit 404 determines to invert the output image (YES in step S1109), the processing proceeds to step S1110. In step S1110, the output inversion unit 404 replaces the black pixels in the image by white pixels and replaces the white pixels by black pixels. The output inversion unit 404 then outputs the image in which the pixel values of all the pixels have been inverted to the output unit 306 and ends the processing of the present flowchart. In FIG. 12B, the output inversion unit 404 is set to ON, and thus an image 1305 in which the white pixels and the black pixels have been inverted after the black thickening processing is output to the output unit 306.

As described above, it is possible to thicken the white lines/white characters by inverting the white pixel areas and the black pixel areas in an input image, thickening the black lines/black characters by using the black thickening unit 403, inverting the white pixel areas and the black pixel areas again, and outputting the resultant image, as illustrated in the processing in FIG. 8. With the above simple configuration, even an image processing apparatus that does not have a module that determines and thickens the white lines/white characters can perform the white lines/white characters thickening processing.

The present exemplary embodiment has been described assuming that all the modules constituting the image processing unit 207 are hardware modules. However, the modules may partially or entirely be realized by software modules.

In the present exemplary embodiment, the black thickening processing is performed on a non-halftone area. However, whether the target pixel is in a non-halftone area or not, the thickening processing may be performed on an object having a text attribute or the thickening amount may be changed based on the attribute information, for example.

Other Exemplary Embodiment

The above exemplary embodiment has been described assuming that the processing is performed on print data input from, for example, an external host computer. However, similar processing may be performed on an image obtained by causing the image reading unit 202 to read an original.

In the above exemplary embodiment, the image processing apparatus includes a module that changes the width of the black lines. After the black pixels and the white pixels in the input image are inverted, the module performs processing. In this way, the black line thickening module thickens the white lines. Alternatively, the image processing apparatus may be configured to include a white line thickening module. In this case, this module thickens the black lines after the black pixels and the white pixels in the input image are inverted.

According to the above exemplary embodiments, a function of thickening black lines/black characters and white lines/white characters thickening processing are achieved with a simpler configuration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is not limited to the above exemplary embodiments. Various changes and modifications may be made to the above exemplary embodiments without departing from the sprit and scope of the present invention. Thus, the following claims have been attached to the description, to make the scope of the present invention public.

The invention claimed is:

1. An image forming apparatus comprising:
   a conversion unit configured to convert a signal value of a white pixel in a first binary image into a signal value of a black pixel and convert a signal value of a black pixel in the first binary image into a signal value of a white pixel, to obtain a second binary image;
   an adjustment unit configured to thicken a width of a black line detected in the second binary image; and
   an output unit configured to convert a signal value of a white pixel into a signal value of a black pixel, convert a signal value of a black pixel into a signal value of a white pixel in the binary image in which the width of the black line has been thickened, and output the binary image.

2. The image forming apparatus according to claim 1, wherein conversion processing for obtaining the second binary image from the first binary image and conversion processing for obtaining the image output by the output unit from the binary image in which the width of the black line has been changed are performed by a single hardware module.

3. The image forming apparatus according to claim 1, comprising:
   a determination unit configured to determine whether an individual pixel in the second binary image is a pixel in a non-halftone area; and
   a determination unit configured to determine a pixel value of the pixel determined to be in the non-halftone area using a pixel value of a pixel neighboring the pixel determined to be in the non-halftone.

4. The image forming apparatus according to claim 3, wherein the determination unit determines whether the pixel is in the non-halftone area by using a certain pattern.

5. The image forming apparatus according to claim 4, wherein the certain pattern is larger than a dot pattern used to represent a halftone area in the second binary image.

6. The image forming apparatus according to claim 1, wherein the first binary image is an image on which halftone processing has been performed.

7. The image forming apparatus according to claim 1, wherein, in a case where a setting for changing a width of a white line included in the first binary image is enabled, the conversion unit performs conversion processing for obtaining the second binary image from the first binary image and the conversion processing for obtaining the image output by the output unit from the binary image in which the width of the black line has been changed.

8. The image forming apparatus according to claim 1, wherein, in a case where a setting for thinning a width of a black line is set, the conversion unit performs the processing for changing the width of the black line detected in the second binary image, without performing conversion processing for obtaining the second binary image from the first binary image and the conversion processing for obtaining the image output by the output unit from the binary image in which the width of the black line has been changed.

9. An image forming apparatus control method comprising:
   converting a signal value of a white pixel in a first binary image into a signal value of a black pixel and converting a signal value of a black pixel in the first binary image into a signal value of a white pixel, to obtain a second binary image;
   thickening a width of a black line detected in the second binary image; and
   converting a signal value of a white pixel into a signal value of a black pixel, converting a signal value of a black pixel into a signal value of a white pixel in the binary image in which the width of the black line has been thickened, and outputting the binary image.

10. A storage medium holding a computer-readable program causing a computer to perform:
   converting a signal value of a white pixel in a first binary image into a signal value of a black pixel and converting a signal value of a black pixel in the first binary image into a signal value of a white pixel, to obtain a second binary image;
   thickening a width of a black line detected in the second binary image; and
   converting a signal value of a white pixel into a signal value of a black pixel, converting a signal value of the black pixel into a signal value of a white pixel in the binary image in which the width of the black line has been thickened, and outputting the binary image.

* * * * *